United States Patent Office

3,251,712
Patented May 17, 1966

3,251,712
METAL PLATING WITH A HEATED HYDROCARBON SOLUTION OF A GROUP VIA METAL CARBONYL
Carl Berger, 18 Cooke Road, Lexington, Mass.
No Drawing. Continuation of application Ser. No. 819,561, June 11, 1959. This application Sept. 21, 1962, Ser. No. 225,370
7 Claims. (Cl. 117—113)

This application is a continuation of applicant's abandoned application Serial No. 819,561, filed on June 11, 1959.

This invention relates to a method for coating surfaces with group VIA metals and more particularly to a method invoving depositing upon a surface, an adherent metal film, said metal film being formed from group VIA metal carbonyls dissolved in a solvent, either liquid or solid.

Various systems have been used to put a molybdenum, tungsten, or chromium surface on various metallic or non-metallic substrates. Included in these are metal spraying, electrophoretic deposition, sputtering and vacuum techniques. High temperatures and slow deposition limit the uses of metal spraying and electrophoretic deposition. The well known vacuum techniques produce quite thin films and are subjected to low production levels, batch production and severe size limitations.

The decomposition of group VIA carbonyl compounds is recorded in the literature. For instance, J. J. Lander (U.S.P. 2,671,739, March 9, 1954), discusses the vapor phase decomposition of molybdenum, tungsten, and chromium carbonyls. Other gas phase decompositions have also been described by Powell (vapor plating). Gas phase decompositions have never attained practical industrial usage since systems must be tightly sealed against atmospheric contamination, constant pressure conditions maintained and gas flow rates strictly controlled. Moreover, many problems exist in vaporizing decomposable materials and in almost all cases carrier gases must be provided to give direction to the flow of the decomposable gas. All additives to the gas stream, in order to modify metal films produced, must be volatile and flow rates strictly controlled. The substrate to be plated must be heated and prepared in the closed system which also leads to many limitations and engineering problems, some of which are insurmountable without resorting to expensive processes or equipment. Finally, many safety precautions must be taken with such systems.

The present invention provides a system where a heat decomposable group VIA compound in solution in a liquid or solid is put into contact with a heated substrate thereby causing the formation of metal on the substrate. The superiority of this technique manifests itself in the fact that the process can be safely performed in an open vessel if desired, the chemical and physical nature of the films produced can be simply altered by changing the concentration of the heat decomposable metal carbonyl, the addition of modifying agents to the solvent, and the alteration of solution and substrate temperatures before deposition. The choice of the proper solvent allows the freshly plated sample and its virgin surface to be protected from contamination (e.g. paraffin wax). The above advantages and others to be described cannot be attained by any other technique available for plating molybdenum, tungsten, or chromium.

The expression "group VIA metals" used in this specification and claims is intended to include those metals in group VI, part A, as shown on the "Periodic Chart of the Atoms," W. F. Neggers, 1947 edition, W. M. Welch Mfg. Co.

While a system in true solution is preferred, an emulsion or suspension of the heat decomposable compound in a solvent can be used. Such emulsion or suspension systems are included within the scope of the present invention. Additives may be dissolved or suspended in the solvent to alter the chemical and physical characteristics of the deposited molybdenum, tungsten, or chromium surface or to maintain emulsion stability.

It is also possible to use the solid materials which are heat decomposable into metal without dissolving them or suspending them in a solvent. The use of the material in this manner does not lend itself to the purposeful alteration of the chemical and physical properties of the metal film deposited on various substrates. In addition, many safety precautions must be taken with this type of system.

An object of this invention is to provide a method for coating almost any type of surface with a group VIA metal, with the only limitation being that the surface itself must be of such a nature that it will not decompose under the influence of the relatively low temperature required in carrying out this method. Thus, surfaces of objects made of metal, glass, suitably hardened clay, various heat resistant plastics etc., may all be coated with a thin coating of pure molybdenum, tungsten, or chromium by this process.

Another object of this invention is to provide an inexpensive means for coating any surface with a thin coating of a group VIA metal by means of subjecting the surface to a liquid or solid solution formed of a heat decomposable compound containing a group VIA metal, said compound being dissolved in a liquid solvent or a solid solvent.

Another object of this invention is to provide an inexpensive means for coating any surface with a thin coating of either molybdenum, tungsten, or chromium which can be used as an intermediate coating for the deposition of metals by conventional means or the deposition of non-metals or plastics, where a group VIA metal is a preferred substrate to improve adhesion.

These and other objects and advantages of this invention will become apparent upon reading the following description.

I have now found a process for the deposition in solvent medium of a group VIA metal on a surface which comprises generally the contacting of a group VIA metal carbonyl, capable of decomposing under heat to liberate a group VIA metal, in a solvent for said compound with a surface or substrate, while maintaining at least a portion of said compound at a temperature of at least in its heat decomposition range.

My invention further includes a process for the deposition in solvent medium of either molybdenum, tungsten, or chromium on a surface which comprises the placing of a group VIA metal carbonyl compound, that can be decomposed in the presence of heat, in a solvent for said compound; heating the resulting solution to a temperature slightly below the heat decomposition range of said compound; heating the said surface to a temperature above about the heat decomposition range of said compound; and contacting the said heated compound with said heated surface.

In addition, I have found new molybdenum, tungsten and chromium compositions formed on a surface by a method which comprises: contacting a group VIA metal carbonyl compound, capable of decomposing under heat to liberate a group VIA metal, in a solvent for said compound with said surface, while maintaining said compound at a temperature of at least in its heat decomposition range.

The production of group VIA metal films on various substrates is of much practical value. Increased corrosion resistance, oxidation resistance, and superior surface hardness are some of the results obtained by this technique. Non-electricity conducting materials such as glass and ceramics may be made electrically conductive by depositing the preceding metal films on them by my process. Metal films deposited on various metals by my technique may serve as intermediate coatings upon which other metals such as chromium may be electrodeposited or deposited in any other conventional manner. These metal films may also be produced on glass vessels by my process to produce decorative effects since films of high gloss are produced on glass.

It is found that any group VIA metal carbonyl capable of decomposing under heat to liberate metal, which can be dissolved or suspended in a solvent medium, can be used to produce metal films on given substrates. Due to the restrictions of cost, availability, safety, and the temperature to which the substrates may be heated, it is found that molybdenum carbonyl, tungsten carbonyl and chromium carbonyl are preferred compounds for use. These materials decompose into molybdenum, tungsten, and chromium respectively upon reaching their ultimate decomposition temperature.

Although it is possible to use pure group VIA metal carbonyls to deposit molybdenum, tungsten, and chromium films, I have discovered that the use of a solvent medium is preferred because of its many advantages. The safety of a solvent system is far superior, for instance. Corrosion and engineering problems are minimized and handling problems are aleviated. Without solvent, closed systems containing inert gases must be used and considerable caution exercised.

The use of the solvent system yields greater economy since the decomposition of metal carbonyl, in excess of that needed to produce a film, is lessened since the metal carbonyl is molecularly dispersed throughout the solvent which dissipates the heat evolving from the substrate to be plated.

Unexpectedly, I have found that the state of molecular aggregation of the metal carbonyl differs from that found, either in the gas state or the solvent free solids, when the said metal carbonyl is dissolved in a solvent medium. This is caused by the interplay of the molecular attractive forces of the metal carbonyl and the solvent. These forces will vary with concentration, temperature, the particular solvent, and the particular group VIA metal carbonyl used. The net result of these factors is that the chemical and physical conditions under which the group VIA metals will deposit on various substrates will and does differ from gas state decomposition or decomposition of the solvent free solids. For instance, it has been found unexpectedly that the decomposition of molybdenum carbonyl starts at a lower temperature in a paraffin wax solvent than when it is decomposed in the solvent free state. For 7.5 percent by weight solution of molybdenum carbonyl in paraffin wax, the difference is about 20–30 degrees centigrade.

Another advantage of the use of the solvent state is that the group VIA metal carbonyls may be dissolved in hot solvents which solidify upon cooling (e.g. paraffin wax) thus providing a convenient handling form for soldering and other applications where a stable solid heat decomposable source of either molybdenum, tungsten, or chromium may be required.

In general, solid and liquid state solvents are useful, especially the hydrocarbons.

Materials which may be used as solvents are higher alkanes, aromatics, and paraffins, which are stable and boil at temperatures greater than the decomposition range of the metal carbonyl compound to be decomposed. Typical of such solvents are n-dodecane, 1,2,3,4-tetramethylbenzene, Tetralin, naphthalene, 1-methyl naphthalene, diphenyl-anthracene, paraffin distillate, paraffin wax and petrolatum (Vaseline). Solvent mediums which may not be used are concentrated nitric acid, concentrated sodium hydroxide solutions, fluorine, bromine, and iodine.

The use of various minor components in the solvent medium causes modification, where desired, of the physical and chemical properties of the metal film deposited. Such agents are wetting agents (to promote adhesion), oxidizing and reducing compounds. Typical of these are calcium phenyl stearate, polydimethylsiloxane, lead soaps, $Na_2S_2O_8$, hydrogen peroxide (anhydrous), $KMnO_4$, $LiAlH_4$, $H_2$, $O_2$, peracetic acid, and others. These important modifications cannot be achieved in either gas state or solvent free solid state deposition of metal from group VIA metal carbonyl compounds.

Surfaces on which molybdenum, tungsten, and chromium can be deposited successfully are copper, iron, steel, aluminum, as well as alloys of the preceding and other metals. In addition, films of these metals can be deposited on glass, ceramics, and other inorganic substrates. Organic or inorganic plastics or resins, which may be heated without decomposing, to above the decomposition temperature of the metal carbonyls may also be utilized. Some phenolics, epoxy resins, and halogenated materials fall into this class.

The handling of solvent systems of the metal carbonyls is similar to the handling of solvent free compounds except that the conditions are far less stringent.

The group VIA metal carbonyl used is dissolved in the appropriate solvent and the substrate, heated in any conventional fashion, is brought into contact with the liquid and a metal film is formed on this substrate. The substrate is allowed to cool and is then rinsed with a cleaning solvent which will remove the residual metal carbonyl and bath solvent. Such a cleaning solvent may be heptane or other lower alkanes such as pentane. If a solvent such as paraffin wax is used as a solvent, the plated substrate may be removed immediately since the cooling paraffin solidifies, thus protecting the newly plated surface from oxidation or other contamination.

One procedure typical of the "soldering stick approach" which may be used is to allow the plating bath to remain at room temperature and to heat the article to be plated sufficiently high, so that when it contacts the liquid or solid bath, it can raise enough of the surrounding metal carbonyl to its decomposition temperature to produce a film of metal on the article. Preferably, the plating bath is raised to slightly below its decomposition temperature or range and the heated article is then submerged. This has the advantage of using lower temperatures for the article to be plated which can therefore prevent physical and chemical deterioration of said article and allow a greater range of articles to be used.

The plating bath may also be made to flow past an article or many articles heated to the proper temperature so that they may decompose the plating liquid flowing by. Finally, the metal carbonyl dissolved in a solid solvent such as paraffin wax, may be formed in stick form to be used to "solder" heated terminals or other connections. Heated paraffin wax solution may be caused to flow onto a surface, solidify, and then the surface may be heated, causing a deposit of metal to form thereon.

The temperature at which decomposition occurs for various solutions of the metal carbonyls, $Mo(CO)_6$, $W(CO)_6$, $Cr(CO)_6$, will vary with the solvent. I have found that the temperatures from about 110° C. through about 170° C. are operative. For molybdenum carbonyl solutions, the effective operating range of decomposition is about 120–160° C.; for tungsten carbonyl about 150–190° C.; for chromium carbonyl about 110–150° C. The solution in which these ranges were established is 5–7 percent by weight solution of metal carbonyl in paraffin wax. The most effective operating temperature in each case is around the middle of the range, of temperatures. At the low end of the range decomposition occurs slowly if at all. At the high end of the range, decomposition occurs, either so rapidly that poor physical properties are obtained in the film, or the sample is so hot that decomposition occurs in the plating bath but not on the surface of the sample.

The time of deposition of the metal film on a given substrate is a matter of a fraction of a second to a few seconds and deposition continues until insufficient heat is available from the substarate to continue the decomposition. The higher the temperature differential between the substrate and the plating solution (presuming that the plating solution is near its decomposition point) the faster will the deposition occur. It is also clear that the thickness of the coat is a direct function of the time that the heated specimen is kept in contact with the plating solution, said specimen having enough heat to continue production of metal film on its surface.

Films of thicknesses from .0001 inch to .001 inch can be deposited on one immersion. By varying the time of immersion and by repeating immersions, thinner and thicker films can be produced. An analysis by spectograph of typical deposited films reveals that they comprise substantially pure group VIA metals with slight amounts of carbide and oxide contaminants.

Coatings deposited by my process are free of atmospheric contamination and can be protected after removal from a bath by utilizing a paraffin wax solvent or allowing to cool within the bath. The metal deposited by this process is extremely active, probably active enough to serve as a catalytic surface. The chemical nature of the metal films can be varied by the addition of small quantities of modifiers to the solvent used. Therefore, small amounts of impurities may be purposely added or the entire metal film may be converted to a molybdenum, tungsten, or chromium derivative, as, for example, to molybdenum carbide or tungsten oxide. None of the systems reported heretofore has the flexibility for producing the above variations and any attempt to do so is met with extermely difficult technical and economic problems.

Because of the chemically pure and active nature of the deposited film, this film can be used as an intermediate coating upon which other metals such as copper or nickel may be deposited by electro-deposition, vacuum deposition, or other conventional means. The use of the metal film or coating as an intermediate may serve to improve adhesion of an outermost layer of metal, prevent diffusion of outermost layers of metal into the base metal, and provide greater corrosion and heat resistance.

The following examples illustrate the novel processes and compositions of the present invention:

Example 1

In 10 grams of paraffin wax, maintained at 70–80° C., 0.5 gram of $Mo(CO)_6$ were dissolved. Heating of the solution was renewed until the 90–100° C. range was attained. In this range a blue-black coloration appeared and a dark precipitate began to settle out. In all probability this indicated the decomposition of $Mo(CO)_6$ at temperatures considerably lower than indicated in the literature (150° C.). The solution was maintained at 100° C. and 2 brass washers heated to red heat were inserted. Both washers immediately were coated with a thin dark coating of molybdenum whose thickness was about 0.0001–0.0003 inch. The brass washers had been heated to greater than 150° C.

Example 2

The same procedure as Example 1 was followed. A piece of porous ceramic (1.0″ x 1.0″ x 1.0″) was heated to about 200° C. and immersed in the molybdenum carbonyl solution. A thin dark coating of molybdenum about 0.0002 inch in thickness was formed. The metal film was dark since it deposits out as a finely subdivided metal. If this plated sample is heated, the metal film assumes a grey metallic like appearance indicating a coalescence of the molybdenum particles.

Example 3

The same procedure as Example 1 was followed. A piece of glass (1.0″ x 1.0″ x 0.1″) was heated to about 175° C. and inserted in the solution. A silver black coating of molybdenum deposited on the glass of thickness 0.0005 inch.

Example 4

The same procedure as Example 1 was followed except that the $Mo(CO)_6$ solution was held at 110° C. A small steel screw was heated to about 150° C. and inserted in the solution. A thin dark coating of molybdenum 0.0001 inch in thickness formed on the screw. The sample was removed from solution immediately, rinsed in heptane and dried. No oxidation occurred as a result of the removal of a hot sample from the solution.

Example 5

The same procedure was followed as Example 1 except that a 7.5% by weight solution of molybdenum carbonyl in paraffin wax was used instead of a 5% solution. A piece of steel shim (2.0″ x 0.1″ x 0.5″), a piece of glass (0.5″ x 0.5″ x 0.1″), and a 1.0″ steel nail were heated and dipped into solution. The results were as follows:

Steel shim (one dip), dark metallic sheen _____ 0.0007″
Glass (one dip), silver black metallic sheen ____ 0.0005″
Nail (four dips), blue-black coating _____ 0.001″

Example 6

A 5.0% by weight solution of molybdenum carbonyl in liquid paraffin wax was poured into a cylindrical mold and allowed to cool. A "soldering stick" resulted. A piece of glass was heated to 300° C. and the "stick" stroked across the surface. This turned a poor electrical conductor into a good electrical conductor.

Example 7

Utilizing a procedure similar to Example 1 a 5% by weight solution of $W(CO)_6$ in paraffin wax was maintained at 145–150° C. and samples of material heated and inserted therein. The results were as follows:

| Material | Temperature, °C. | Description | Thickness, inches |
|---|---|---|---|
| Steel nail | 175 | Dark coating | 0.0002 |
| Brass washer | 150 | Dark spotty coating | 0.0001 |
| Glass | 200 | Mirror-like coating | 0.0003 |
| Ceramic | 195 | Lustrous black coating | 0.0003 |
| Steel screw | 225 | Black coating | 0.0003 |
| Aluminum screw | 200 | Black coating | 0.0002 |
| Steel shim | 195 | Dull grey metallic film | 0.0002 |
| Iron wire | 185 | Grey and black film | 0.0001 |
| Steel washer | 198 | Black coating | 0.0003 |

A variety of useful purposes were served by the above. The glass and ceramic specimens were electrically nonconductive before deposition but carried current readily after tungsten was deposited thereon. In addition the steel samples such as the nails and steel shims obtained extremely hard and heat resistant costs of tungsten.

Example 8

Using exactly the procedure of Example 6, a tungsten "soldering" stick was produced and used to join two heated electrical wires, thereby allowing current to flow between two electrical circuits.

Example 9

0.2 gram of chromium carbonyl, 0.3 gram of tungsten carbonyl, and 0.25 gram of molybdenum carbonyl are dissolved in 10 grams of vaseline. The temperature of the solution is raised to 105° C. and a steel shim, heated to 230° C. is thrust into the solution. A black blue coating results which is an alloy of molybdenum, tungsten, and chromium. The coated steel shim was placed in a nickel plating bath and nickel plated thereon.

*Example 10*

The procedure of Example 7 was followed except that 0.25 gram of calcium phenylstearate was added to the solution. On testing the adhesion of the tungsten to the steel shim by a tape peel test, it appeared that the adhesion of the tungsten to the steel substrate was improved by the presence of the surface active agent.

In conducting the general process of this invention, the surface to be coated must be of sufficiently high temperature to raise that portion of the bath, which comes into direct contact with the surface, above 120° C. for $Cr(CO)_6$, 140° C. for $Mo(CO)_6$ and 160° C. for $W(CO)_6$, all of which are dissolved in a 5.0–7.5% by weight solution in paraffin wax. To do this, when these solutions have been preheated to a temperature slightly below the heat decomposition range of the metal carbonyls, respectively, the substrate or surface must be heated to a minimum of 140° C. for $Cr(CO)_6$, 150° C. for $Mo(CO)_6$ and 160° C. for $W(CO)_6$, respectively. It can be concluded from my results that using various solvents will result in a variance of the decomposition point of the metal carbonyls. In addition, sufficient variation of concentration of the metal carbonyls in various solvents, both liquid and solid, will affect the continuity, porosity, and thickness of the film deposited. This has enabled me to produce metal coatings having accurately controlled characteristics.

As the concentration of the heat decomposable compound is lowered the distance between successively decomposing molecules is lengthened and less overlapping of deposited metal atoms is likely to occur. Accordingly, the film is less continuous and greater gaps will also result, yielding increased porosity. Since fewer molecules are in a given heated volume, fewer will be deposited and a thinner film will result. Inversely, increased concentration will result in greater continuity and thickness.

Moreover, I have observed that combinations of the three metal carbonyls, in solution give a composite which deposits alloys of molybdenum, tungsten, and chromium. This deposition is accomplished by using the above three metal carbonyls dissolved in paraffin distillate, paraffin wax, vaseline or other suitable solvents such as higher alkanes and aromatics.

A particular advantage of using solvent systems is that the metal carbonyls are more safely handled in solution and engineering problems for production equipment are simpler. Another important advantage is that upon removal from the "plating" bath and cooling a protective solvent coat (solid paraffin wax) can be utilized, if desired, that remains and protects the metal plated substrate against oxidation, for example.

At the point of decomposition, that portion of the bath decomposes which has reached the decomposition temperature and deposits metal on the surface. From the examples, it can be seen that the exact temperature of the surface may be varied in causing deposition of the metal film, so long as it is somewhat above the decomposition temperature of the metal containing compound in solution.

After the initial flash of metal, the coating may be thickened by leaving the object in the bath for an additional length of time. However, the substrate must be sufficiently hot so that its outermost surface, which is now either Mo, W, or Cr is also above the decomposition temperature of that portion of the bath with which it now comes into contact. The thickening of the coating will stop either at the point that the object is removed from the bath or at the point where the outermost surface drops below the decomposition temperature of the metal carbonyls in the bath.

The object to be coated is usually dipped into the bath. However, the "soldering" approach of Examples 6 and 8 have been used frequently.

The bath itself is pre-heated to a point slightly below its decomposition temperature. For example, a typical plating bath may be preheated to about 100° C. Thus, the surface to be coated need be raised only slightly above the temperature of decomposition of the bath since the surface has only to raise that portion of the bath with which it comes into contact a few degrees (i.e. about 30–40 degrees centigrade) to cause decomposition and deposition of metal thereon.

As can be seen, another advantage of this process for coating surfaces is that the surfaces need be heated only to a relatively low temperature and the process takes place very quickly with a relatively inexpensive bath.

Although it is desirable to carry out the coating process in an inert atmosphere, that is, an atmosphere containing no oxygen and no carbon dioxide, the method is operative under atmospheric conditions, but a more chemically pure coating is obtained in an inert atmosphere.

It is observed therefore that my invention provides a simple, economical method for producing pure or modified films of molybdenum, tungsten, and chromium (Examples 1, 7, and 9). In addition, "soldering" sticks for providing electrical connections have been produced (Example 6), non-electrical conductors have been made conductive (Example 7), and decorative tungsten films have been produced (Example 7, glass). Heat resistance and hardness can be provided by the use of the deposited tungsten film to protect steel (Example 7). The techniques' use as an intermediate coating for electroplating (Example 9) has been demonstrated.

This invention may be further developed within the scope of the following appended claims. Accordingly, it is desired that the foregoing description be read as being merely illustrative of an operative embodiment of this invention and not in a strictly limiting sense.

Having fully described the method herein, I now claim:

1. A process for the deposition in solvent medium of a group VIA metal on a surface which comprises: placing a group VIA metal carbonyl compound, capable of decomposing under heat to liberate said metal, in a hydrocarbon solvent for said compound, said solvent being stable at and boiling at temperatures greater than the heat decomposition temperature of said compound; heating the resulting solution to a temperature below but not more than about 40° C. below the minimum heat decomposition temperature of said compound in said solvent and heating the said surface to a temperature above about the minimum heat decomposition temperature of said compound; and immersing said heated surface in said heated solution to effect deposition of the metal on said surface.

2. The process of claim 1 wherein the group VIA metal carbonyl compound is selected from the group consisting of molybdenum, tungsten, and chromium carbonyls.

3. The process of claim 1 wherein said Group VIA metal carbonyl compound contains an oxidizing agent to oxidize the metal deposited upon decomposition of said Group VIA metal carbonyl compound.

4. The process of claim 1 wherein said Group VIA metal carbonyl compound contains a reducing agent to reduce any oxidized metal deposited upon decomposition of said Group VIA metal carbonyl compound.

5. The process of claim 1 wherein said Group VIA metal carbonyl compound contains a wetting agent.

6. A process for the deposition in solvent medium of a group VIA metal on a surface which comprises: placing a group VIA metal carbonyl compound, capable of decomposing under heat to liberate said metal, in a hydrocarbon solvent for said compound; heating the resulting solution to a temperature slightly below the heat decomposition temperature range of said compound in said solvent but sufficiently below the decomposition temperature to prevent volatilization and heating the said surface to a temperature above about the heat decomposition temperature of said compound; and placing said heated surface in said heated solution to effect deposition of the metal on said surface.

7. A process for the decomposition in solvent medium of a group VIA metal on a surface which comprises: placing a group VIA metal carbonyl compound, capable of decomposing under heat to liberate said metal, in a hydrocarbon solvent for said compound, said hydrocarbon solvent being selected from the group consisting of alkanes and aromatics; heating the resulting solution to a temperature slightly below the heat decomposition temperature range of said compound in said solvent but not more than about 40° C. below the minimum heat decomposition temperature of said compound in said solvent and heating the said surface to a temperature above about the heat decomposition temperature of said compound; and immersing said heated surface in said heated solution to effect deposition of the metal on said surface.

References Cited by the Examiner

UNITED STATES PATENTS

| | | | |
|---|---|---|---|
| 2,523,461 | 9/1950 | Young | 117—47 |
| 2,918,392 | 12/1959 | Beller | 117—107.2 |
| 2,979,424 | 4/1961 | Whitehurst et al. | 117—227 |
| 3,014,197 | 6/1962 | Berger | 117—107.2 |

FOREIGN PATENTS

| | | |
|---|---|---|
| 934,787 | 1/1948 | France. |
| 38,926 | 3/1887 | Germany. |
| 1,007,479 | 5/1957 | Germany. |
| 1,072,914 | 1/1960 | Germany. |
| 1,073,113 | 1/1960 | Germany. |
| 1,084,542 | 6/1960 | Germany. |
| 21,025 | 1890 | Great Britain. |
| 185,682 | 3/1937 | Switzerland. |

RICHARD D. NEVIUS, *Primary Examiner.*

W. L. JARVIS, *Assistant Examiner.*